Patented Dec. 12, 1933

1,938,912

UNITED STATES PATENT OFFICE 1,938,912

SUBSTITUTED HALOGEN-PHENOLS

Emil Klarmann, Jersey City, and Louis W. Gates, Bloomfield, N. J., assignors to Lehn & Fink, Inc., Bloomfield, N. J., a corporation of Delaware No Drawing. Application November 2, 1932
Serial No. 640,898

7 Claims. (Cl. 260—154)

In accordance with the present invention, we have produced substituted halogen-phenols in which at least 3 hydrocarbon radicals are substituted in the ring, one or more of these substituting hydrocarbon radicals having not less than 2 carbon atoms, and have found that such compounds are highly effective as bactericidal agents, and particularly with respect to bacteria of the type of Staphylococcus aureus.

In the following description of methods for the production and compounds in accordance with the present invention, we have frequently for simplicity referred to chloro-substituted phenols. It is to be understood, however, that similar methods may be employed, using corresponding compounds in which other halogens, such as bromine or iodine as the substituents.

A dimethyl-isopropyl-halogen phenol may be prepared in the following manner: A halogenated xylenol, such as p-chloro-symm.-m-xylenol is placed in a vessel suitably equipped with stirring mechanism and a mixture of concentrated sulfuric acid and isopropyl alcohol is added drop by drop in the course of one hour with constant stirring while maintaining a temperature of about 80° C. The proportions by weight may suitably be 92 parts of the chloro-xylenol, 88 parts of the sulfuric acid and 35 parts of the isopropyl alcohol. Heating is continued for an additional period, say about 3 hours, to complete the reaction. The mixture is diluted with water, the separated oil washed free of acid and extracted with methyl-alcoholic alkali. It is precipitated by the addition of acid and finally distilled in vacuo. The product distills at about 125° F. at 3 mm. Hg. It has a phenol coefficient with respect to B. typhosus of 81 and with respect to Staph. aureus of 310.

It will be apparent that by the use of other alcohols than the isopropyl, the isopropyl radical may be replaced in such a compound with other suitable hydrocarbon radicals. Thus, by the use of a butyl alcohol a butyl-dimethyl-chloro-phenol can be produced. Instead of with alcohols, the condensation may be effected with halogen substituted hydrocarbons, employing suitable condensing agents, such as aluminum chloride, zinc chloride, ferric chloride or the like. Likewise, by the use of xylenols substituted with other halogens, such as the corresponding iodo or bromo-xylenols, corresponding substituted halogen-phenols in which the halogen is bromine or iodine may be prepared.

Another compound illustrating the invention may be prepared by reacting upon about 79 parts of p-chloro-symm.-m-xylenol admixed with about 132 parts of zinc chloride and heated, suitably in an oil bath, to about 175° C., with 44 parts of an amyl alcohol, such as diethyl carbinol. The latter is added slowly, over a period of about 2 hours, while stirring. Heating is continued after the addition of the diethyl carbinol and the reaction mixture, after cooling, is poured into water and the desired product separated and extracted, suitably with alcoholic alkali. On precipitation and purification, the pure product is found to boil at 141–142° C. at 3 mm. Hg. Its phenol coefficient with respect to Staph. aureus is 1,143.

Other methods of introducing the desired additional hydrocarbon radical or radicals may be employed. For example, 2-ethyl-3,5-dimethyl-4-chloro-phenol may be prepared as follows: Symmetrical chloro-xylenol is heated with acetic anhydride and anhydrous sodium acetate, in the proportions of about 157 parts of the chloro-xylenol to 204 parts of the acetic anhydride and 14 parts of the sodium acetate. The resulting acetate is purified by vacuum distillation and crystallization, suitably from a mixture of isopropyl alcohol and water.

To about 99 parts of the resulting 3,5-dimethyl-4-chloro-phenyl-acetate, about 91.4 parts of anhydrous aluminum chloride are added in small portions, and the mixture finally heated to 140° C., say for about 30 minutes. An intra-molecular rearrangement takes place, forming 4,6-dimethyl-5-chloro-2-hydroxy-acetophenone. The resulting mixture is extracted with an alkali, suitably aqueous potassium hydroxide solution, the compound separated by the addition of acid and purified, suitably by crystallization from 50% alcohol. The resulting ketone is heated under a reflex condenser with zinc amalgam and hydrochloric acid for a sufficient period to effect the desired reduction, say about 16 hours, concentrated hydrochloric acid being added from time to time through the condenser. The resulting product is purified in any suitable manner, for example, it may be taken up in alcoholic alkali, reprecipitated by addition of acid, and crystallized from a mixture of benzene and petroleum ether. The product is 2-ethyl-3,5-dimethyl-4-chloro-phenol and melts at about 97.5° C. It has a phenol coefficient with respect to B. typhosus of about 48.8 and with respect to Staph. aureus of about 113.04.

It is readily apparent that by using halogen substituted derivatives of other xylenols, the substituting hydrocarbon groups may be positioned at other points in the ring. In addition, other compounds may be employed initially.

For example, p-chloro-thymol (3-methyl-6-isopropyl-4-chloro-phenol) may be treated with acetyl chloride in the proportions of about 92.3 parts of the former to 82.4 parts of the latter. The resulting ester is purified, for example, by distillation, and heated with anhydrous aluminum chloride to effect intra-molecular rearrangement with formation of 6-methyl-3-isopropyl-5-chloro-2-hydroxy-acetophenone. Water is added, and the hydroxy-phenone is washed, then separated, suitably by extraction with aqueous alkali. It is then separated by precipitation, suitably with acid, and further purified, being finally distilled in vacuo. The fraction distilling between 127 and 133° C. at 3 mm. Hg is isolated. This ketone is then reduced, suitably with zinc amalgam and hydrochloric acid, forming 2-ethyl - 3 - methyl - 6 - isopropyl -4-chloro-phenol. The compound is an oily liquid, boiling at 132° C. at 2 mm. Hg. It has a phenol coefficient of 56.7 with respect to B. typhosus and of 200 with respect to Staph. aureus.

By using bromo or iodo-thymol in place of the chloro-thymol referred to in the above example, corresponding halogen compounds may be produced. Furthermore, by using other acid chlorides in place of acetyl chloride, such as propionyl chloride, benzoyl chloride, phenyl acetyl chloride or the like, corresponding hydrocarbon groups may be introduced into the compound. Furthermore, by using halogenated carvacrols, other similar compounds may be prepared with the methyl and isopropyl groups in the 2 and 5 positions respectively, and the ethyl groups in position 6.

Instead of employing initially a halogen-phenol for the reaction for the production of compounds in accordance with the present invention, a third hydrocarbon radical may be introduced into a phenol substituted with 2 hydrocarbon radicals, and the halogen subsequently introduced. For example, by employing initially symmetrical m-xylenol, converting it into an ester of an acid having more than 2 carbon atoms such as an acetate, propionate, butyrate, phenyl acetate, benzoate or the like and effecting intromolecular rearrangement of the resulting compound by the use of aluminum chloride under suitable conditions, for example, in nitrobenzene solution at approximately 60° C., in the case of fatty acid esters, the corresponding phenone is produced in which the ketone group takes the para position relative to the hydroxyl group. This ketone group may be reduced to the hydrocarbon group containing the same number of carbon atoms and by the use of suitable halogenating agents, such as sulfuryl chloride, a halogen may be introduced in the ortho position relative to the hydroxyl group. In this manner, a substituted phenol may be produced with substituting hydrocarbon radicals in the 3, 4 and 5 positions and the substituting halogen in the 2 position. By proceeding in a similar manner, employing initially a phenol with substituting hydrocarbon radicals in the 3 and 4 positions, a compound may be prepared having substituted hydrocarbon radicals in the 3, 4 and 6 positions and halogen in the 2 position.

It is readily apparent that one of the substituting radicals of the compound prepared in accordance with the present invention may be an alkyl group, cycloalkyl, arylalkyl groups or another hydrocarbon radical.

In the compounds of the present invention, it is our belief that the total molecular weight of the substituting hydrocarbon radicals is important in securing products of high bactericidal potency, and we have found that compounds of the halogenated phenol type having 3 substituting hydrocarbon radicals in which one of the substituting hydrocarbon radicals has not less than 2 carbon atoms so that the total of the carbon atoms in the substituting hydrocarbon radicals is at least 4 are highly effective bactericides, and particularly with respect to organisms of the type of Staphylococcus aureus.

We claim:

1. A mono-halogenated phenol having 3 substituting hydrocarbon radicals in the ring, at least one of said substituting hydrocarbon radicals having not less than 2 carbon atoms.
2. A trialkyl mono-halogenated phenol, in which the one of the substituting alkyl groups has not less than 2 carbon atoms.
3. A trialkyl chlorophenol in which the sum of the carbon atoms of the 3 alkyl groups is at least 4.
4. 2-(diethyl methyl)-3,5-dimethyl-4-chloro-phenol.
5. 2-isopropyl-3,5-dimethyl-4-chlorophenol.
6. An alkyl substituted halogenated thymol.
7. 2 - ethyl-3-methyl-6-isopropyl-4-chlorophenol.

EMIL KLARMANN.
LOUIS W. GATES.